Figure 11:
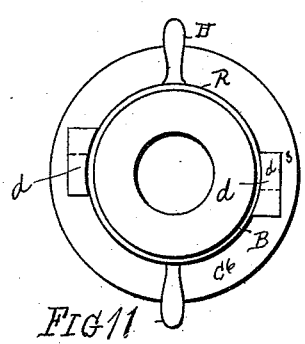

(No Model.) 2 Sheets—Sheet 1.
P. McENANY.
CONNECTION FOR THE STEAM HEATING PIPES OF RAILROAD CARS.
No. 438,356. Patented Oct. 14, 1890.
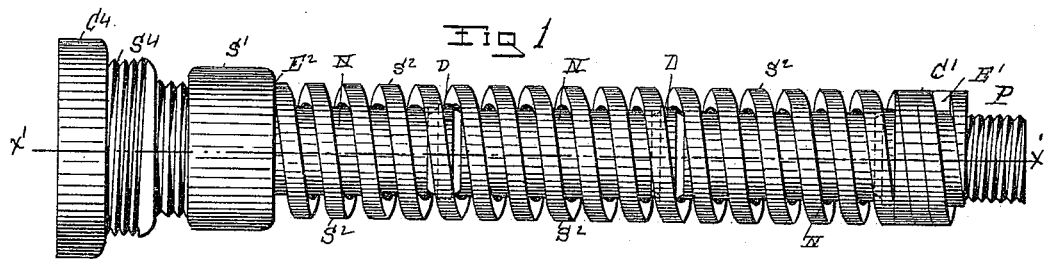
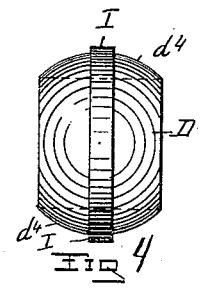
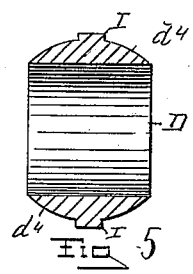
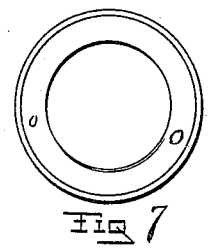
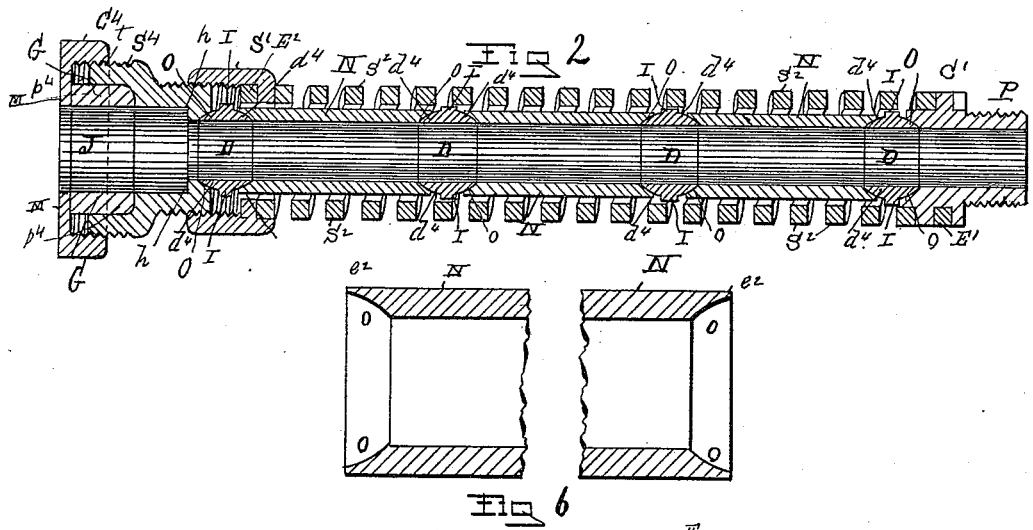
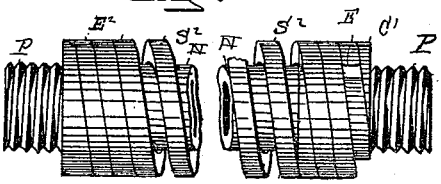
WITNESSES
William A. Swett
Charles S. Burdwell
INVENTOR
Patrick McEnany
by W. B. Hagan
atty
THE NORRIS PETERS CO., PHOTO-LITHO., WASHINGTON, D. C.

(No Model.) 2 Sheets—Sheet 2.

P. McENANY.
CONNECTION FOR THE STEAM HEATING PIPES OF RAILROAD CARS.

No. 438,356. Patented Oct. 14, 1890.

WITNESSES
William A. Sweet
Charles S. Burtnall

INVENTOR
Patrick McEnany
by W. Eberson atty

UNITED STATES PATENT OFFICE.

PATRICK McENANY, OF TROY, NEW YORK.

CONNECTION FOR THE STEAM-HEATING PIPES OF RAILROAD-CARS.

SPECIFICATION forming part of Letters Patent No. 438,356, dated October 14, 1890.

Application filed January 17, 1890. Serial No. 337,250. (No model.)

*To all whom it may concern:*

Be it known that I, PATRICK MCENANY, of the city of Troy, county of Rensselaer, and State of New York, have invented a new and useful Improvement in Flexible Connections for Steam-Heating Pipes of Railway-Cars, of which the following is a specification.

My invention relates to improvements upon that class of connections used between the cars of a railway-train upon the pipes employed to heat the cars; and my invention has for its object the making of a part of the pipe flexible where between the coupler part and its connections with the car, to thus adapt it to the lateral swaying of the cars and to the movement of the latter when passing around curves. My invention also has for its object a means to connect the said flexible ends of the pipes for the passage of steam through them.

My invention consists, as will be more fully detailed hereinafter in connection with its illustration, in the combination, with two main-pipe ends that are rounded out concavely and each of which is provided with an encircling collar or sleeves, one of said collars or sleeves being rigidly secured to the main-pipe end which it surrounds and the collar or sleeve of the other being threaded onto the main-pipe end which it encircles, of a series of pipe-sections made with their ends rounded out concavely, a series of balls having a central passage-way and provided with a centrally-arranged encircling collar with one of the centrally-apertured balls placed with one of its convex ends within each of the rounded-out ends of the main pipes, and one of the pipe-sections arranged between each two of the centrally-apertured balls of a series, with the convex-end surfaces of the latter engaging with the concave-end surfaces of the pipe-sections, and a spiral spring encircling said centrally-apertured balls and pipe-sections, and with one of its ends connected with the collar and the other end with the sleeve encircling the main-pipe ends.

My invention also consists, as will be set forth in the claims, in the construction and arrangement of two coupler parts, each made the counterpart of the other, for connecting and disconnecting the steam-heating pipes of a train, in which the pipe between the car and the coupling parts are each made flexible by means of a concave surface formed in the end of each of the coupler parts and main steam-pipes, and centrally-apertured balls having convex exterior end surfaces inserted in the concave-end surfaces of the coupler and main steam-pipe, and a series of pipe-sections having concave ends and centrally-apertured balls having convex ends alternatingly arranged between each of said coupler parts and each of the main pipes, and a spiral spring encircling said centrally-apertured balls and pipe-sections connected at one of its ends to a collar secured to the main steam-pipes and at its other end to a sleeve threaded onto said coupler part.

Figure 10:
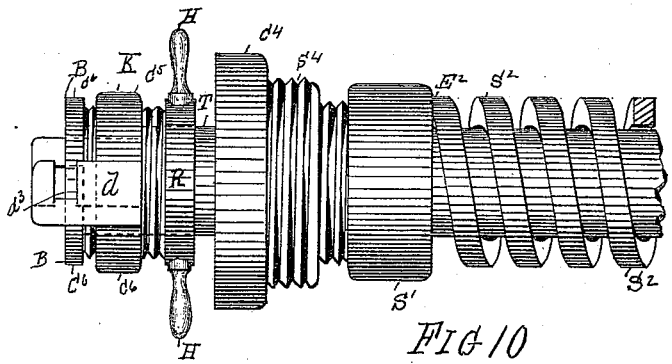
Figure 9:
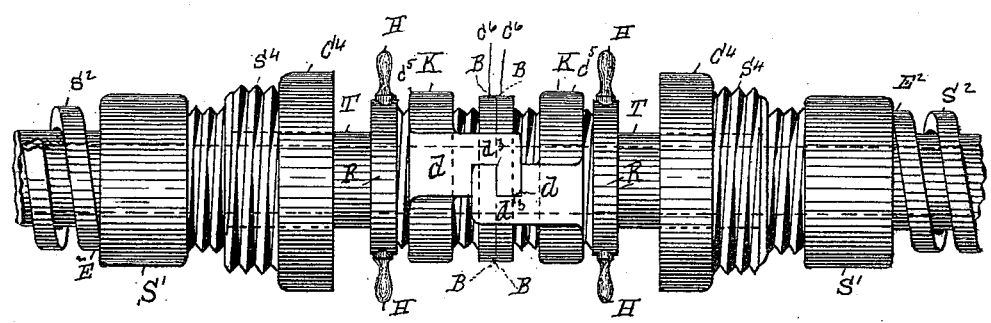
Figure 8:
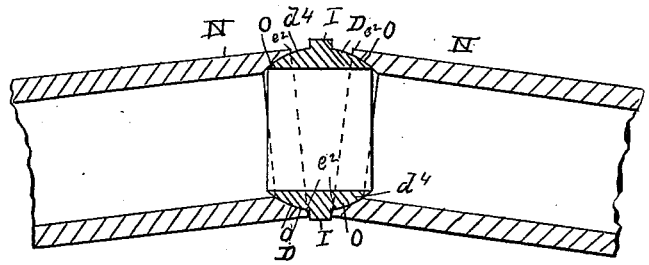

Accompanying this specification, to form a part of it, there are two plates of drawings, containing eleven figures illustrating my invention, with the same designation of parts by letter-reference used in all of them. Of these illustrations, Figure 1 is a side elevation of the apparatus containing my invention for making a pipe flexible, and shown as provided with a stuffing-box and slideway for use in connection with a coupler tail-piece. Fig. 2 is a section of the apparatus shown at Fig. 1, taken on the line $x'$ $x'$ of Fig. 1. Fig. 3 shows my invention as applied to making a metallic pipe flexible, and without a coupler-connection, with the central part broken out. Fig. 4 shows in side elevation one of the centrally-apertured balls. Fig. 5 is a central vertical section of one of the pipe-sections, all of which latter are made alike. Fig. 6 is a longitudinal central section of one of the pipe-sections. Fig. 7 is an end view of the same, which corresponds in form to the end of the main steam-pipes where rounded out to receive one of the centrally-apertured balls, and also to the end of the coupler part where engaging with one of the centrally-apertured balls. Fig. 8 shows a vertical section taken centrally through one of the centrally-apertured balls, and two of the pipe-sections with the outer ends of the latter deflected to illustrate the flexible condition of the connection. Fig. 9 is a side elevation of the coupler parts as connected, illustrating a part of each of the flexible connections and spring. Fig. 10 shows in a side elevation one of the coupler parts and part of the flexible connection and encircling-spring.

Fig. 11 shows an end view of one of the coupler parts and its slide.

The several parts of the mechanism thus illustrated are designated by letter reference, and the function of the parts is described as follows:

The letters P, Figs. 1, 2, and 3, designate the main pipes, with which the flexible-pipe parts connect, as shown at Figs. 2 and 3. One of these end connections is made with a coupler-part slide and in the other, where the flexible pipe is not connected, with a coupler.

The letters C' designate a collar that is arranged on one of the main-pipe ends, and S' a sleeve that is made on the other main pipe or the coupler part, and this sleeve is threaded onto the latter or the end of the main pipe, so as to turn on its threaded connection. The ends of the main pipe, or one end of the latter, and the end of the coupler part when used are each rounded out concavely, as shown at Figs. 2 and 7, and indicated at O.

The letters N designate pipe-sections, which are also rounded out at their ends, as indicated at o, Figs. 2, 6, and 7.

The letters D designate centrally-apertured balls, which have their end surfaces rounded off convexly, as indicated at Figs. 2, 4, 5, and 8, the convexity of these centrally-apertured balls being in parallel lines of curve to the concavity of the end pipes P and the pipe-sections N, so that they will rotate therein in steam-tight engagement.

The letter I designates a collar arranged to encircle each of the centrally-apertured balls, as shown at Figs. 1, 2, 4, 5, and 8, and the function of this collar is to regulate the measure of the rotation between the surfaces of the centrally-apertured balls and the concave surfaces of the pipe-sections, with which they engage, as will be subsequently described more fully. To adapt these pipe-sections and centrally-apertured balls to make a flexible connection between the coupler parts and the main steam-pipe, or between two of the latter, as shown at Fig. 7, one of the centrally-apertured balls is inserted with its convex-end surface in contact with the concave-end surface of the main steam-pipes or one of the latter and the rounded-out end of the coupler part, so as to slightly rotate therein, with a series of pipe-sections and centrally-apertured balls arranged in the same manner alternatingly between the said end-placed centrally-apertured balls where within the coupler part at one end and the main steam-pipe at the other end, as shown at Figs. 2 and 7.

The letter $S^2$ designates a spiral spring having its end E' secured to the collar C, rigidly attached to the outer end of the main steam-pipe, and with the other end of said spring $E^2$ secured to the sleeve S', said sleeve being threaded onto the main pipe, as shown at Fig. 7, or onto the coupler part, as shown at Fig. 2. As thus made and arranged said sleeve S' may be screwed up, so as to draw on the spring and keep it in place. This spring $S^2$ is arranged to encircle the pipe-sections and the centrally-apertured balls and to keep their rounded surfaces in end engagement, but not in contact therewith, there being space enough between the spring, the pipe-sections, and apertured balls to allow of their angular movement in connection with the spring. The function of the collar C is merely to connect the spring to the main-pipe end.

As thus made and arranged, with the convex end of one of the centrally-apertured balls adapted to rotate to a limited extent in the concave ends of the main pipe, or one of the latter, and a coupler part with alternatingly-arranged pipe-sections having rounded-out ends, and centrally-apertured balls having concavely-rounded-off ends, the whole being kept together and in rotating contact by means of a spring secured at its ends to the ends of the main pipe, or one end of the latter, and a coupler part constructed to receive the convex end of a pivot-nipple, a metallic flexible pipe is produced that is useful for many purposes.

The collar I, made on each of the centrally-apertured balls, limits the rotation of the parts by engaging with the edges $e^2$ of the concavities formed in the pipes with which it pivotally connects, as shown at Fig. 8.

The coupler parts K are each made alike in their working parts.

The letters B designate the abutting faces of the coupler parts, which are provided with packing.

The letters T designate the coupler tail-pieces, and $S^4$ a sleeve arranged thereon. This sleeve is exteriorly threaded, and the letter $C^4$ designates a collar threaded onto said sleeve.

The letters d designate clutch parts that are connected to the collar $C^5$ of each coupler part K, at opposite sides thereof, and arranged on each coupler part to subtend laterally the rim of the collar $C^6$, on which are located the bearing-faces B, and to lap past the collar $C^6$ of the other coupler part when the bearing-faces thereof abut. Each of these clutch parts d is made to lock into the clutch part of the other when the collars are turned toward each other by means of a slot $d^3$, made in the approaching side edges of each of the clutch parts.

The letter R designates a ring having handles H, which ring is secured to each of the collars $C^4$, so that either of the latter, when the clutches of the two coupler parts have been made to interlock, may be turned to tighten the connection made between the bearing-faces of the coupler parts.

The letter J designates a slideway made in the interior of the collar $C^4$ and sleeve $S^4$, into which the tail-piece T may slide telescopically. This slideway has an abutting shoulder h to limit the measure of slide, and the letter G designates a gland or stuffing-box formed by the ring-form end M of the collar $C^4$, the latter being threaded at t to receive the sleeve $S^4$, and the latter being made with the annular concavity O, adapted to engage with the convexity of one of the centrally-apertured balls D.

The letter $p^4$ designates the gland-packing.

While I have shown my method of making a metallic pipe flexible as applied for use to a connection between the steam-heating pipes of a railway-train, it may be employed for other purposes where the use of such a pipe is desirable.

The number of centrally-apertured balls and intermediate nipples proper, constructed and arranged to connect as I have shown and described them, may be varied to meet the measure of flexion desired.

Having thus described my invention, what I claim, and desire to secure by Letters Patent, is—

1. The combination, with two main pipes, each having their adjacent ends rounded out concavely, one of said pipes having thereat a rigidly-secured collar and the other provided with a threaded sleeve, of intermediately-arranged and centrally-apertured balls, made with an encircling collar, and a pipe-section having concavely-rounded-out ends, with one of the centrally-apertured balls arranged to rotate in one of the main-pipe ends and in one of the ends of the pipe-section, intermediately placed, and a spiral spring encircling said centrally-apertured balls and pipe-section, with one end of said spring connected to the collar on one of the main-pipe ends and the other end of said spring connected with the sleeve on the other main-pipe end, substantially in the manner as and for the purposes set forth.

2. The combination, with two main pipes, each having their adjacent ends rounded out concavely, with one of the main-pipe ends having a collar rigidly secured thereon and the other of said main-pipe ends having thereon a threaded sleeve, of a series of pipe-sections having their ends rounded out concavely, a series of centrally-apertured balls provided with an encircling collar, with one of said balls arranged between the main-pipe ends and one of said pipe-sections and between each two of the latter, and a spiral spring encircling said pipe-sections and centrally-apertured balls, with one end of said spring attached to the collar on one of the main-pipe ends and the other end of said spring connected with the sleeve upon the other main-pipe end, substantially in the manner as and for the purposes set forth.

3. The combination, with the coupler parts K K, each made with the abutting packing-faces B, and each provided with a tail-piece T, a sleeve $S^4$, made with the collar $C^4$, slideway J, and gland G, a collar $C^5$, provided with the clutch part $d$, made with interlocking recess $d^3$, and each of said coupler parts threaded onto each of said tail-pieces, and each provided with the ring R, having handles H, constructed and arranged to operate substantially in the manner as and for the purposes set forth.

Signed at Troy, New York, this 21st day of October, 1889, and in the presence of the two witnesses whose names are hereto written.

PATRICK McENANY.

Witnesses:
CHARLES S. BRINTNALL,
W. E. HAGAN.